United States Patent
Whitehead et al.

[11] Patent Number: 5,831,212
[45] Date of Patent: Nov. 3, 1998

[54] ELECTRICAL JUNCTION BOX FOR A POURED CONCRETE FLOOR

[75] Inventors: James H. Whitehead, Collierville, Tenn.; Donald E. Smith, Collins, Mo.

[73] Assignee: Thomas & Betts Corporation, Memphis, Tenn.

[21] Appl. No.: 489,605

[22] Filed: Jun. 12, 1995

[51] Int. Cl.⁶ .................................................. H02G 3/08
[52] U.S. Cl. ............................................................ 174/50
[58] Field of Search ................................ 174/50, 48, 49, 174/38; 220/3.3, 3.4; 52/576, 577

[56] References Cited

U.S. PATENT DOCUMENTS

| | | |
|---|---|---|
| 34,099 | 1/1862 | Althouse . |
| 141,945 | 8/1873 | O'Callahan . |
| 1,173,362 | 2/1916 | Linkletter . |
| 1,945,683 | 2/1934 | Fullman ..................................... 247/15 |
| 2,573,482 | 10/1951 | Peik ........................................... 72/124 |
| 3,208,525 | 9/1965 | Crowley ..................................... 52/224 |
| 3,280,525 | 10/1966 | Crowley ..................................... 52/224 |
| 3,343,704 | 9/1967 | Terry ......................................... 220/3.4 |
| 4,922,672 | 5/1990 | Bartee et al. .............................. 52/221 |
| 5,088,246 | 2/1992 | Brown ..................................... 52/127.8 |
| 5,257,487 | 11/1993 | Bantz et al. ............................ 52/220.1 |
| 5,258,572 | 11/1993 | Ozeki et al. ................................ 174/38 |
| 5,420,376 | 5/1995 | Rajecki et al. ............................. 174/48 |
| 5,466,886 | 11/1995 | Langyel et al. ............................ 174/48 |

*Primary Examiner*—Bot L. Ledynh
*Assistant Examiner*—Joseph Waks
*Attorney, Agent, or Firm*—Hoffman & Baron, LLP

[57] ABSTRACT

An electrical junction box is positionable within a poured concrete floor. An upper extent of the junction box extends above the concrete floor and may be cut off so that the junction box becomes flush with the floor surface. The junction box includes a housing having a bottom surface and an upwardly extending side wall bounding the bottom surface. An anchor element is formed on the side wall adjacent the upper extent thereof. The anchor element defines a partially bounded exteriorally communicating region for accommodating therein the poured concrete so as to maintain the side wall in contact with the concrete floor, preventing inward deformation of the side wall.

13 Claims, 3 Drawing Sheets

ELECTRICAL JUNCTION BOX FOR A POURED CONCRETE FLOOR

FIELD OF THE INVENTION

The present invention relates generally to an electrical junction box which accommodates terminations of electrical cables. More particularly, the present invention relates to a plastic electrical junction box accommodated within a poured concrete floor.

BACKGROUND OF THE INVENTION

The use of an electrical junction box to accommodate electrical cable terminations is well known in the electrical cable distribution art. These junction boxes may house electrical connection components such as outlets, receptacles and the like. In certain instances, these junction boxes are used in floor applications where electrical cable distribution takes place beneath the surface of the floor. The junction box permits the electrical cables to extend therethrough and also allows for the connection and termination of the electrical cables to the components housed within the junction box.

In many floor applications, the junction box may be positioned on a deck which accommodates concrete which is poured over the deck to form the floor. The deck would include ducts, conduits or corrugations therein which permit passage of the cable therethrough. In these applications, the junction box is positioned on the deck in communication with the duct, conduit or corrugations prior to pouring the concrete. Once the box is properly positioned, the concrete is poured onto the deck so as to surround the junction box and form a concrete floor.

In order to accommodate variations in the poured concrete floor thickness, the junction box is typically constructed so that the upper end of the box extends above the level of the poured concrete floor. Once the concrete floor has set, the installer can cut away the extending portion of the box so that it extends flush with the upper surface of the poured concrete floor. Such cutting may be accomplished by hand sawing the extending portion of the box. During this process, especially with respect to plastic floor boxes, the sides of the box may flex under the force of the saw. Upon such flexing, a space is created between the walls of the box and the concrete formed therearound. Loose pieces of concrete and other debris in the area has a tendency to back-fill into the space between the flexed wall of the box and the concrete floor. As a result of the collection of debris in the space, the wall of the box assumes a permanent internal bow or deformation. Such a bow in the wall of the box makes internal adjustment of the box difficult to accomplish. Also, such internal bowing reduces the useable interior space and makes it more difficult for the installer to effect connections within the box. This problem is especially prevalent in plastic rectangular floor boxes where the elongate side walls have a greater tendency to bow or flex either under the force of the saw or under the force of the concrete poured therearound.

It is therefore desirable to provide a floor box which is securely anchored within a poured concrete floor so as to prevent bowing or flexing of the side walls upon cutting the upper end of the box flush with the floor.

SUMMARY OF THE INVENTION

It is an object of the present invention to provide an improved electrical junction box for positioning within a poured concrete floor.

It is a further object of the present invention to provide a junction box which is securely positioned within a poured concrete floor and which resists flexing of the walls of the box upon cutting of the box flush with the floor surface.

It is a still further object to provide a plastic rectangular floor box having anchor elements which extend from the side walls of the box and into the poured concrete to retain the side walls against the poured concrete floor.

The efficient attainment of these and other objects, the present invention provides an electrical junction box for positioning within a floor formed by concrete poured around the box. The junction box includes a housing having a bottom surface and a deformable upwardly extending side wall perimetrically bounding the bottom surface and defining a housing open end adjacent an upper extent of the side wall. The housing includes a housing interior accessible through the open upper end for accommodating electrical cable terminations. An anchor element is formed on the side wall adjacent the upper extent thereof. The anchor element defines a partially bounded exteriorally communicating region for accommodating therein the poured concrete of the floor so as to prevent deformation of the side wall and maintain the upper extent of the side wall in substantial contact with the concrete floor upon an internally directed force against the exterior of the side wall.

As more particularly described by way of the preferred embodiment herein, the present invention includes a plastic rectangular junction box for positioning within a poured concrete floor. The junction box has a height which is greater than the height of the poured floor, and which may be subsequently cut flush with the floor surface. Opposed side walls of the junction box include a pair of outwardly extending longitudinal dove-tail ribs. The ribs form therebetween a dove-tail channel which accommodates poured concrete therein. The side wall is thereby retained against the poured concrete floor preventing inward bowing of the side wall upon cutting of the upper extent of the junction box.

In applications where boxes having longer side walls are employed, additional sets of ribs may be employed therealong.

DETAILED DESCRIPTION OF THE PREFERRED EMBODIMENT

Figure 1:
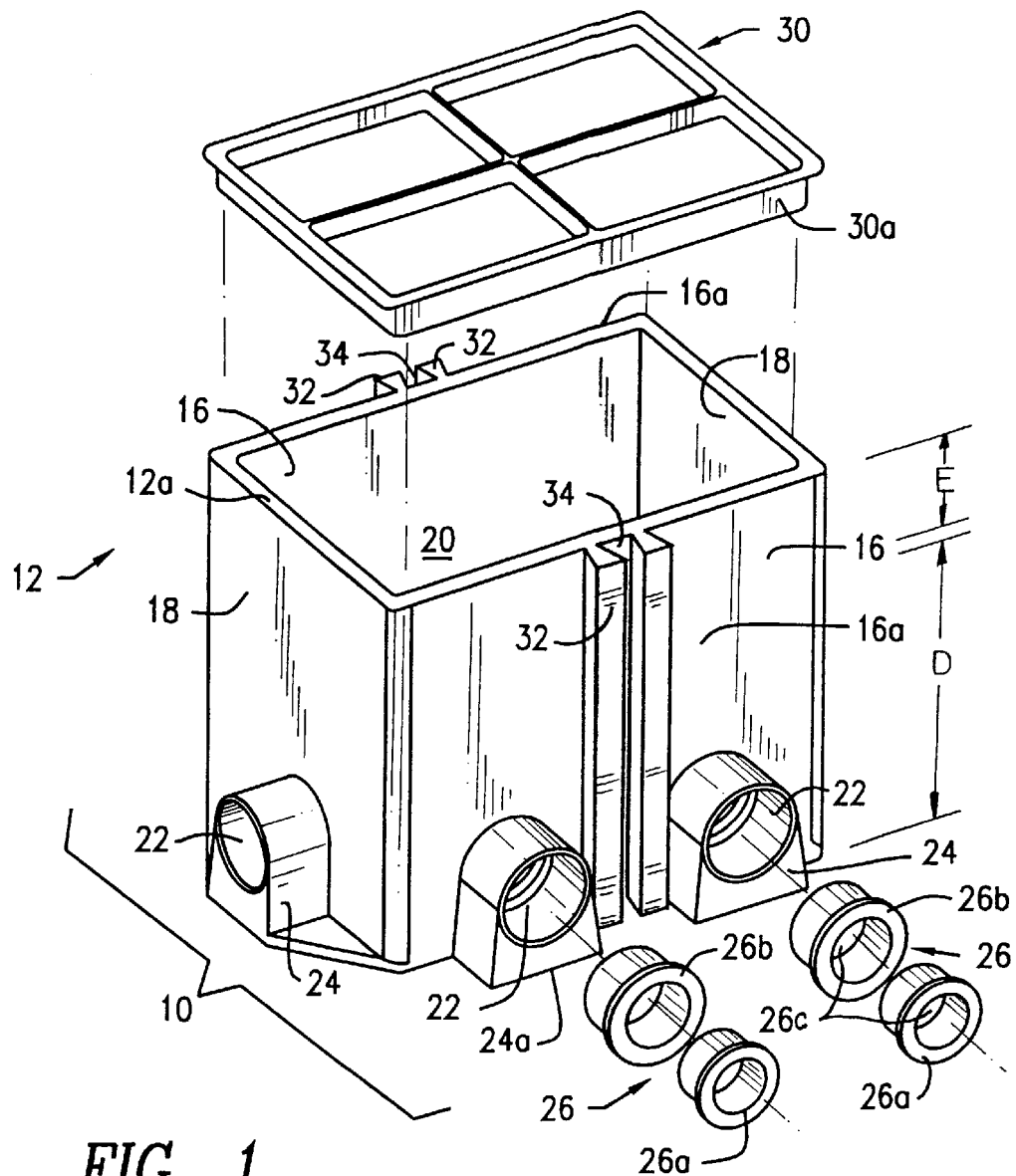
FIG. 1 is an exploded perspective view of the rectangular junction box of the present invention.

Referring to the drawings, an electrical junction box 10 of the present invention is shown. Junction box 10 may be referred to as a floor box, which is positionable within a poured concrete floor, so as to permit electrical cable distribution and termination beneath the floor. Junction box 10 is typically a plastic member including a rectangular, integrally formed box housing 12. Housing 12 is formed by a planar bottom wall 14, and opposed pairs of longitudinal side walls 16 and transverse end walls 18 which extend upwardly from bottom wall 14. Bottom wall 14, side walls 16 and end walls 18 form a open ended bounded interior 20 therein. The interior 20 of housing 12 may be used to accommodate electrical cables (not shown) which may be terminated to electrical components (also not shown) such as outlets, receptacles and the like. In order to permit entry of electrical cables into housing 12, side walls 16 and end walls 18 may include access openings 22 adjacent bottom wall 14. Each access opening 22 includes a removable knock out 22a (FIG. 3), which may be selectively removed to permit cable passage therethrough. In the present embodiment, end walls 18 include a single access opening 22 while longitudinal side walls 16 include a pair of spaced apart access openings 22. Access openings 22 are used to accommodate cable conduits (not shown) through which electrical cable may be run. Each of the access openings 22 is bounded by a generally annular collar 24 having a flat bottom 24a coplanar with bottom wall 14. Collar 24 permits the insertable accommodation of reducer caps 26 into access openings 22. Reducer caps 26 include nestable members 26a and 26b which permit accommodation of different sized conduits. Also each nestable member 26a and 26b includes a knock out 26c which may be used to close off unused access openings if the knock out 22a has been inadvertently removed therefrom.

Figure 2:
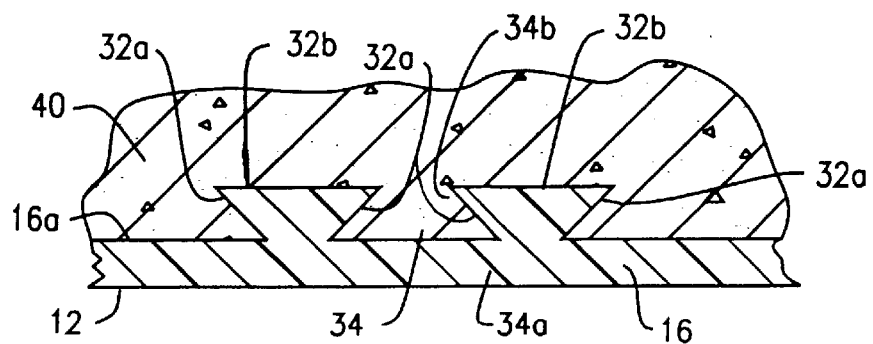
FIG. 2 is a partial sectional showing of a portion of the rectangular box of FIG. 1 with concrete poured therearound.
Figure 3:
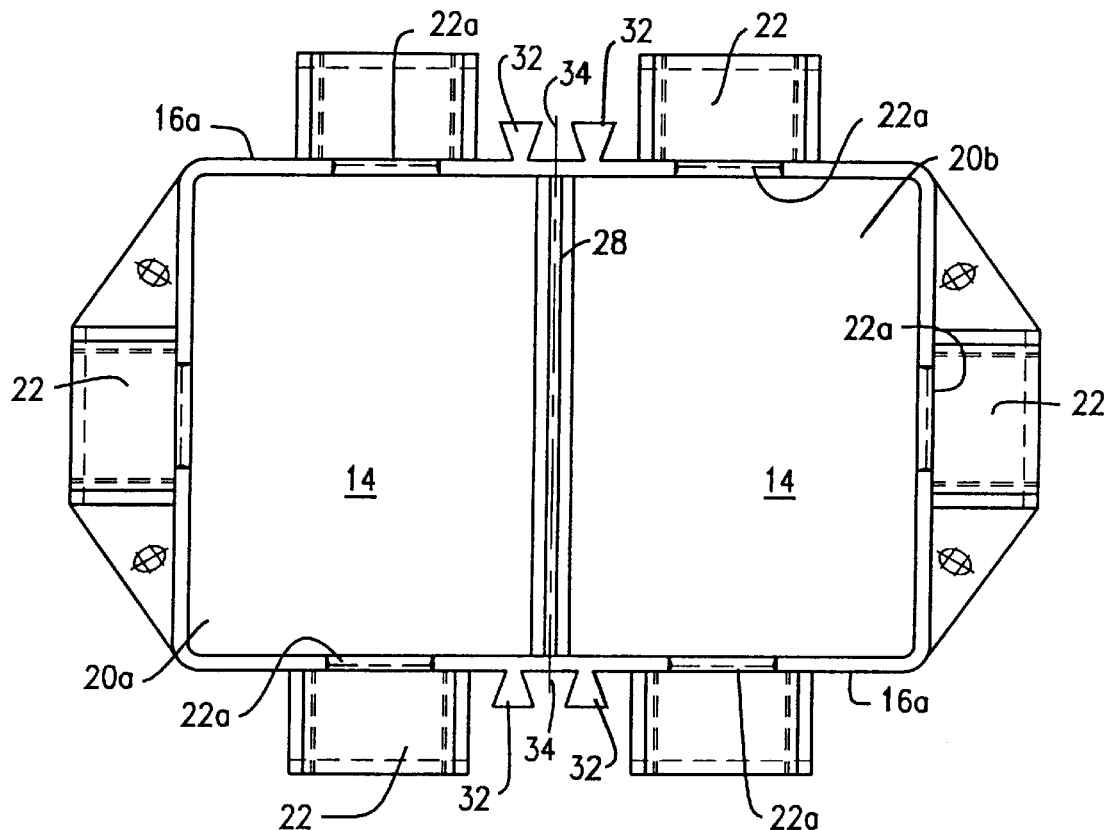
FIG. 3 is a top plan view of the rectangular junction box of FIG. 1.

As shown in FIGS. 2 and 3, the lower portion of the interior 20 of housing 12 may be transversely divided by dividing wall 28. Dividing wall 28 divides the interior 20 into two side by side interior compartments 20a and 20b. Such compartments may be used to house and separate connection components, such as power components and communications components.

The open upper end 12a of housing 12 may be enclosed with a cover 30. Cover 30 may be seated over the open upper end 12a and is used during the installation of box 10 to prevent debris and other contaminants from entering the interior 20 during the pouring of the concrete floor therearound. Further, cover 30 includes a depending lip 30a which frictionally seats within the upper open end 12a of housing 12. Cover 30 supports side walls 16 during the pouring of concrete 40 therearound preventing inward bowing of the side walls.

In order to anchor the walls of the box in the poured concrete, each longitudinal side wall 16 includes on an exterior surface 16a thereof, a pair of outwardly extending integrally formed ribs 32. Ribs 32 are elongate transversely spaced members extending from the upper end 12a of housing 12 to the bottom wall 14. As particularly shown in FIG. 2, ribs 32 have a truncated triangular or dove-tail shaped cross section. Each rib 32 includes an opposed pair of inwardly tapering side walls 32a and a longitudinal back wall 32b forming the base of the triangle. In a reverse fashion, the space between each rib 32 forms a truncated triangular or dove-tail shaped channel 34. Channel 34 is open to the exterior of box 10 and includes a wider base 34a along side wall 16 and a tapered forward end 34b spaced outwardly therefrom. Channel 34 forms a tapered region between each of the dove-tail ribs 32 which, as will be described in further detail hereinbelow, accommodates concrete 40 which is poured around box 10.

Figure 4:
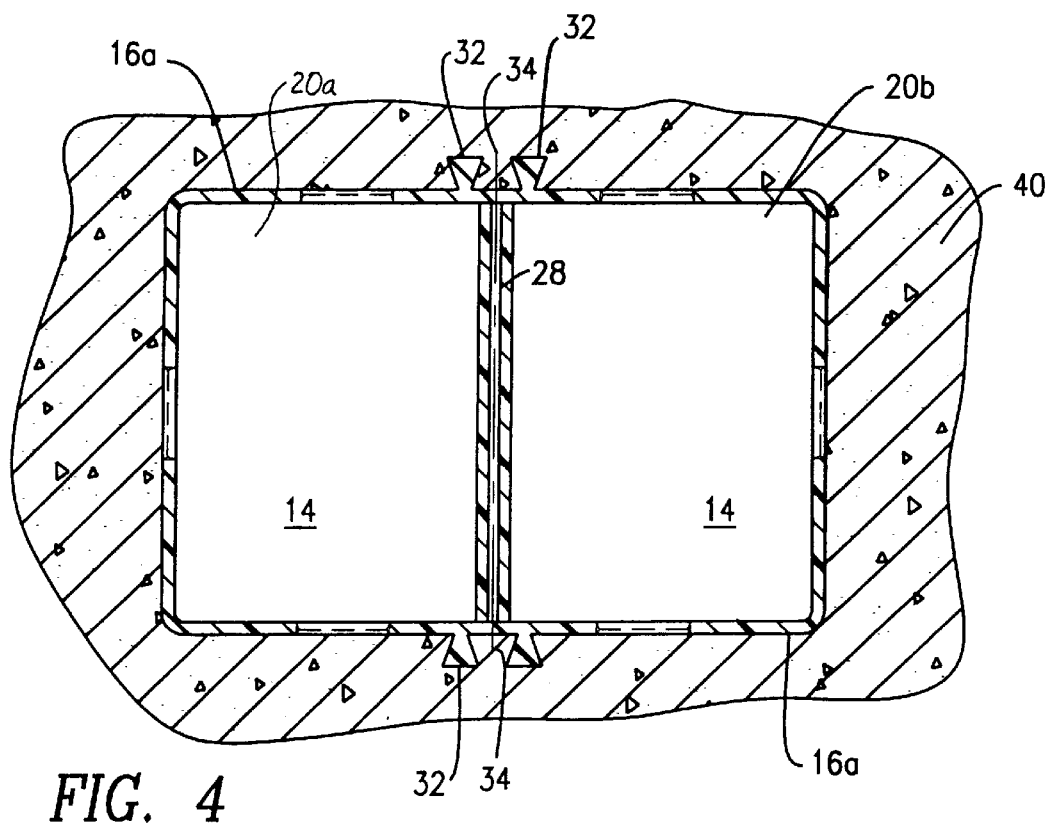
FIG. 4 is a horizontal sectional showing of the junction box of FIG. 1 positioned within a poured concrete floor.

In use, housing 12 is placed on a deck or other subsurface, (not shown) onto which the concrete floor is formed. Cover 30 is inserted over open upper end 12a of housing 12. Reducer caps 26 are inserted into selected access openings 22. The appropriate knock outs 22a, 26c are removed from access openings 22 and reducer caps 26 respectively. Conduit is inserted into the selected access openings 22 for subsequent routing of electrical cable. The box 10 is thereby sealed from entry of concrete or contaminants. As shown in FIGS. 2 and 4, in conventional fashion concrete is poured around box 10 so as to form a concrete floor on the deck or subsurface. Concrete 40 is typically poured to an approximate depth of D (FIG. 1), whereupon an extent E of the upper end 12a of housing 12 extends above the upper surface of the poured concrete floor. The concrete 40 poured around box 10 has a tendency to flow completely around the box. The cover 30 helps prevent inward bowing or flexing of the side walls 16 during pouring. Also, by the particular construction of ribs 32, concrete 40 flows into dove-tail shaped channel 34 formed between spaced apart ribs 32. As channel 34 is open to the exterior of box 10, the poured concrete can readily flow thereinto. The channel 34 fills with concrete and due to the particular shape of channel 34 and ribs 32, the concrete 46 which hardens in channel 34, locks the side wall thereagainst. The ribs 32 forming an anchor securing the side walls 16 against the hardened concrete prevent inward bowing of the side walls 16 upon removal of cover 30.

After the concrete has fully set, the upper end 12a of housing 12 extending above the concrete surface may be cut off so that the box extends flush with the upper surface of concrete floor 40. In practice an installer would use a hand saw to cut the housing flush with the concrete floor. As the side walls 16 are anchored against the concrete floor 40 by virtue of ribs 32 and channel 34 formed therebetween, upon cutting the side walls, the side walls will not bow or deflect into the interior 20 of housing 12. Such anchoring prevents a gap from being formed between the exterior surface 16a of side wall 16 and the concrete floor 40. This prevents debris, pieces of concrete or the like which may be in the area, from back-filling into the space behind the side wall 16.

In the preferred embodiment of the present invention shown in FIG. 1, one pair of spaced apart ribs 32 are shown on each of the longitudinal side walls 16. It is further contemplated that a pair of ribs may also be provided on transverse end walls 18. Further, due to the dove-tail shape of the ribs 32, it is contemplated that only one rib need be provided on each side wall 16. The area between the tapered side walls 32a (FIG. 2) and exterior surface 16a of side wall 16 forms a region which accommodates concrete 40 therebetween. However, the arrangement of a pair of ribs 32 as shown in FIG. 1 has been found to be preferable.

Figure 5:
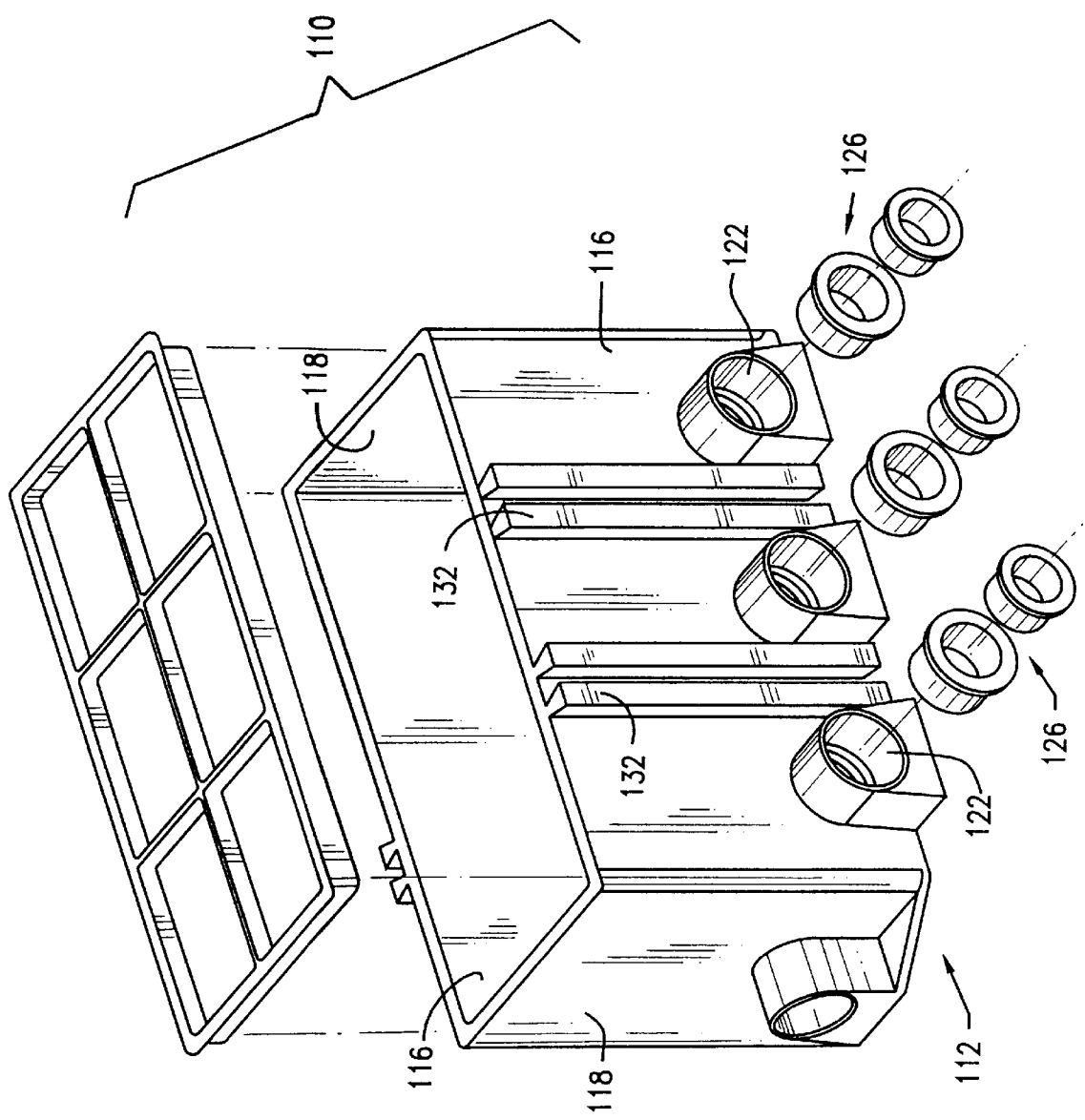
FIG. 5 is an exploded perspective view of the further embodiment of the rectangular junction box of the present invention.

In a further embodiment shown in FIG. 5, an extended length junction box 100 is shown. The box 100 is substantially similar to box 10 of FIG. 1. Box 100 includes a box housing 112 having end walls 118 and having extended length longitudinal side walls 116. Side walls 116 include three cable access apertures 122 and associated reducer caps 126. More than one dividing wall (not shown) may be used to divide the interior 120 of housing 112. In the present embodiment, each side wall 116 may include two pairs of spaced apart ribs 132, so as to assure that the extended length side walls 116 remain in contact with the concrete floor poured therearound.

Various changes to the foregoing described and shown structures would now be evident to those skilled in the art. Accordingly, the particularly disclosed scope of the invention is set forth in the following claims.

What is claimed is:

1. An electrical junction box for positioning within a floor formed by concrete poured around said box, said junction box comprising:

a housing having a bottom surface, a deformable upwardly extending side wall perimetrically bounding said bottom surface and defining a housing open end adjacent an upper extent of said side wall, said housing having a housing interior accessible through said open upper end for accommodating electrical cable terminations; and an anchor element formed on said side wall adjacent said upper extent thereof, said anchor element defining a partially-bounded exteriorly-communicating region for accommodating therein said poured concrete so as to prevent deformation of said side wall and maintain said upper extent of said side wall in substantial contact with said poured concrete floor, said region having an exterior open end and an opposed closed end, said closed end being wider than said open end.

2. A junction box of claim 1 wherein said anchor element further includes an anchor wall portion spaced from said side wall and wherein said region is defined between said anchor wall portion and said side wall.

3. A junction box of claim 1 wherein said anchor element further includes an outwardly directed first dove tail shaped rib extending along said side wall, said dove tail shaped rib having a truncated triangular cross-sectional shape tapering inwardly towards said side wall.

4. A junction box of claim 3 wherein said rib extends longitudinally from adjacent said open end of said housing to adjacent said bottom surface.

5. A junction box of claim 3 wherein said anchor element includes a second dove-tail shaped rib spaced from said first dove-tail shaped rib.

6. A junction box of claim 1 wherein said housing is generally rectangular and wherein said side wall includes opposed pairs of spaced apart side wall portions.

7. A junction box of claim 6 wherein one of said anchor elements is formed on each said side wall portion of one of said opposed pairs.

8. A junction box of claim 7 wherein each said anchor element includes a pair of dove-tailed shaped elongate ribs aligned in spaced apart relationship, said ribs defining a dove-tailed shaped channel therebetween in exterior communication for accommodating said poured concrete.

9. A rectangular plastic junction box positionable to permit cement to be poured therearound to form a floor having an upper surface, said box comprising:

a box housing having an interior defined by a bottom wall and upwardly extending side walls bounding said bottom wall, upper extents of said side walls extending for positioning beyond said upper surface of said floor; and at least one of said side wall including a concrete receiving region adjacent said upper extent thereof, said concrete receiving region communicating exteriorly of said housing so as to permit entry of said poured concrete forming said floor therein, said region having an exterior open end and an opposed closed end, said closed end being wider than said open end so as to retain said one side wall in contact with said floor upon cutting of said upper extents of said side walls flush with said upper surface of said floor.

10. A junction box of claim 9 wherein said box includes opposed pairs of generally parallel side walls and wherein each said side wall of one said pair includes said concrete receiving region.

11. A junction box of claim 10 wherein said each said side wall of said one pair includes a dove-tail rib extending outwardly therefrom, said rib and said side wall defining said concrete receiving region therebetween.

12. A junction box of claim 10 wherein each said side wall of said one pair includes a pair of elongate spaced apart dove-tail ribs extending exteriorly therefrom, said pair of ribs defining said concrete receiving region therebetween.

13. A junction box of claim 12 wherein said box includes a pair of opposed longitudinal side walls and a pair of opposed transverse side walls and wherein said concrete receiving region is formed on each of said longitudinal side walls.

* * * * *